| | US009545933B2 |

(12) United States Patent
Nishimura et al.

(10) Patent No.: US 9,545,933 B2
(45) Date of Patent: Jan. 17, 2017

(54) AIR SPRING AND RAILCAR (71) Applicant: KAWASAKI JUKOGYO KABUSHIKI KAISHA, Hyogo (JP)

(72) Inventors: Takehiro Nishimura, Kobe (JP); Yasufumi Okumura, Kobe (JP); Kazuhiro Onishi, Kobe (JP); Chihiro Okayama, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/908,717

(22) PCT Filed: Jul. 31, 2014

(86) PCT No.: PCT/JP2014/004030
§ 371 (c)(1),
(2) Date: Jan. 29, 2016

(87) PCT Pub. No.: WO2015/015809
PCT Pub. Date: Feb. 5, 2015

(65) Prior Publication Data
US 2016/0185363 A1 Jun. 30, 2016

(30) Foreign Application Priority Data
Jul. 31, 2013 (JP) .................................. 2013-159567

(51) Int. Cl.
*B61F 5/10* (2006.01)
*F16F 9/05* (2006.01)
*F16F 13/00* (2006.01)

(52) U.S. Cl.
CPC . *B61F 5/10* (2013.01); *F16F 9/05* (2013.01); *F16F 13/002* (2013.01)

(58) Field of Classification Search
CPC .............. B61F 5/10; F16F 13/002; F16F 9/05; F16F 9/049
(Continued)

(56) References Cited

U.S. PATENT DOCUMENTS 3,826,507 A * 7/1974 Brand .................... B60G 11/28
105/198.1
4,357,879 A * 11/1982 Mohacsi ................... B61F 5/10
105/182.1
(Continued)

FOREIGN PATENT DOCUMENTS

JP H03-107630 A 5/1991
JP 05-077638 U 10/1993
(Continued)

OTHER PUBLICATIONS

International Search Report of PCT/JP2014/004030 mailed Aug. 26, 2014.

*Primary Examiner* — Thoams J Williams
*Assistant Examiner* — Mariano Sy
(74) *Attorney, Agent, or Firm* — Studebaker & Brackett PC (57) ABSTRACT

An air spring (2) includes: an upper surface plate (21); a lower surface plate (22); an elastic film (23) airtightly coupling a peripheral portion of the upper surface plate (21) and a peripheral portion of the lower surface plate (22) to each other to form an air chamber (24) inside the elastic film (23); an elastic stopper (25) connected to the lower surface plate (22); and at least one of an internal pipe (45) or internal wire (55) extending from an upper surface of the upper surface plate (21) to a side surface of the elastic stopper (25). A part of a pipe and/or wire extending between a carbody (11) and a bogie (1) of a railcar (100) is constituted by the internal pipe (45) and/or internal wire (55) of the air spring (2).

8 Claims, 7 Drawing Sheets (58) Field of Classification Search
USPC ...... 267/140, 35, 3, 64.19, 64.27; 105/198.1
See application file for complete search history.

(56) References Cited

U.S. PATENT DOCUMENTS

| | | | | |
|---|---|---|---|---|
| 6,257,561 | B1* | 7/2001 | Nakayama | F16F 9/05 |
| | | | | 267/122 |
| 8,511,653 | B2* | 8/2013 | Fujimoto | F16F 9/052 |
| | | | | 267/35 |
| 9,061,689 | B2* | 6/2015 | Fujimoto | B61F 5/02 |
| 9,278,699 | B2* | 3/2016 | Sachan | B60G 11/27 |
| 9,340,217 | B2* | 5/2016 | Sato | B61F 5/10 |
| 9,387,865 | B2* | 7/2016 | Jackson, Jr. | B61F 5/10 |
| 2011/0315044 | A1* | 12/2011 | Maeyama | B61F 5/10 |
| | | | | 105/198.1 |
| 2015/0175176 | A1* | 6/2015 | Sato | B61F 5/10 |
| | | | | 105/198.1 |
| 2016/0236532 | A1* | 8/2016 | Moulik | F16F 9/05 |

FOREIGN PATENT DOCUMENTS

| | | |
|---|---|---|
| JP | 07-017399 A | 1/1995 |
| JP | H08-128501 A | 5/1996 |
| JP | H11-034870 A | 2/1999 |
| JP | 2008-095798 A | 4/2008 |
| JP | 2008-222073 A | 9/2008 |

* cited by examiner

AIR SPRING AND RAILCAR

TECHNICAL FIELD

The present invention relates to the structure of an air spring and the structure of a railcar including the air spring as a bolster spring.

BACKGROUND ART

A carbody of a railcar is supported by a bogie through a carbody suspension including a bolster spring. The bolster spring is a spring provided between a bogie frame of the bogie and the carbody. The bolster spring relaxes an impact transferred from the bogie to the carbody to improve ride quality of the railcar. Typically used as the bolster spring is an air spring.

The railcar is provided with pipes and wires extending between the carbody and the bogie. One of the pipes extending between the carbody and the bogie is a brake pipe. The brake pipe is a pipe connecting a compressor provided at the carbody with brake equipment provided at each of wheels of the bogie. Compressed air is supplied from the compressor through the brake pipe to the brake equipment. Examples of the wires extending between the carbody and the bogie include lead wires of electric motors, ground wires, and sensor wires. Examples of a method of wiring the lead wires of the electric motor include a method in which the lead wires are wired upward from the electric motor provided at the bogie directly to the carbody and a method in which the lead wires are gathered at a middle portion of the bogie and then wired upward to the carbody.

When separating the carbody and the bogie from each other for maintenance, the pipes and wires extending between the carbody and the bogie need to be detached to the carbody side and the bogie side. Since work of separating the carbody and the bogie from each other and coupling the carbody and the bogie to each other includes work of disconnecting and connecting the wires and pipes extending between the carbody and the bogie, such work requires a lot of labor and is complicated. A technology of simplifying the work of separating the carbody and the bogie from each other and coupling the carbody and the bogie to each other has been proposed. For example, according to the railcar described in PTL 1, an interposed member is provided between the air spring and the carbody. A brake connection pipe connected to a brake mechanism through a hose is provided in the interposed member, the brake mechanism being provided at the bogie. The brake connection pipe communicates with a positioning pin provided on an upper surface of the interposed member. Further, a connection pipe and a level controlling valve are provided in the interposed member, and compressed air is supplied through the connection pipe and the level controlling valve to an air chamber of the air spring. The connection pipe communicates with a positioning pin provided on the upper surface of the interposed member. When the carbody is placed on the interposed member, an air pressure source provided at the carbody and the brake mechanism are connected to each other through the brake connection pipe and the hose, and the air pressure source provided at the carbody and the air chamber of the air spring are connected to each other through the connection pipe.

CITATION LIST

Patent Literature

PTL 1: Japanese Laid-Open Patent Application Publication No. 7-17399

SUMMARY OF INVENTION

Technical Problem

As described above, the wires and pipes extending between the carbody and the bogie complicate the work of separating the carbody and the bogie from each other and the work of coupling the carbody and the bogie to each other. In addition, regarding the wires and pipes extending between the carbody and the bogie, there are constraint conditions in a design phase. Examples of the constraint conditions are as follows: the number of wires and pipes is large; to reduce displacement amounts of the wires and pipes, the wires and pipes are provided at a middle portion of the railcar; and contact of the wires and pipes with each other caused by the displacement of the railcar need to be avoided. These constraint conditions make the design of the railcar difficult.

The present invention was made in light of the above circumstances, and an object of the present invention is to, in a railcar in which a carbody is supported by a bogie through a carbody suspension including an air spring, facilitating work of disconnecting and connecting wires and pipes extending between the carbody and the bogie and also facilitating a design of the railcar including the wires and pipes extending between the carbody and the bogie.

Solution to Problem

An air spring according to the present invention includes: an upper surface plate; a lower surface plate provided so as to oppose the upper surface plate; an elastic film airtightly coupling a peripheral portion of the upper surface plate and a peripheral portion of the lower surface plate to each other to form an air chamber inside the elastic film; an elastic stopper connected to the lower surface plate; and at least one of an internal pipe or an internal wire, the internal pipe extending from an upper surface of the upper surface plate to a side surface of the elastic stopper, the internal wire extending from the upper surface of the upper surface plate to the side surface of the elastic stopper.

A railcar according to the present invention includes: a carbody; a bogie; an interface plate provided at the carbody; and the air spring provided between the interface plate and a bogie frame of the bogie.

According to the air spring configured as above, at least one of the internal pipe or the internal wire is provided, and the air spring can be efficiently utilized as a space for the pipe and/or the wire. Further, according to the railcar including the air spring, the wires and/or pipes extending between the carbody and the bogie are collected at the air spring. Therefore, the railcar is easily configured such that the wires and pipes extending between the carbody and the bogie are connected by connecting the interface plate provided at the carbody and the air spring. Since the railcar is configured as above, it is possible to easily realize such a structure that the work of disconnecting and connecting the wires and/or pipes extending between the carbody and the bogie is easy. Since the internal pipes and/or internal wires of the air spring are used as a part of the wires and/or pipes extending between the carbody and the bogie, the wires and/or pipes extending between the carbody and the bogie in the railcar are arranged orderly. In addition, portions of the wires and pipes extend in the air spring, the portions tending to contact with each other when the carbody is displaced relative to the bogie. Therefore, the contact of the pipes and/or wires with each other by the displacement of the railcar is avoided. Since the routing of the wires and/or pipes extending between the carbody and the bogie is determined as above when designing the railcar, the degree of freedom of the design of the railcar increases, and the design of the railcar can be simplified.

Advantageous Effects of Invention

According to the present invention, the inside of the air spring can be efficiently utilized as a space for pipes and/or wires. Since the railcar includes the air spring as a bolster spring, it is possible to easily realize such a structure that the work of disconnecting and connecting the wires and/or pipes extending between the carbody and the bogie is easy. Further, according to the railcar including the air spring as the bolster spring, the contact of the pipes or wires with each other by the displacement of the railcar is avoided. Since the routing of the wires and pipes extending between the carbody and the bogie is determined as above when designing the railcar, the design of the railcar can be simplified.

DESCRIPTION OF EMBODIMENTS

Figure 1:
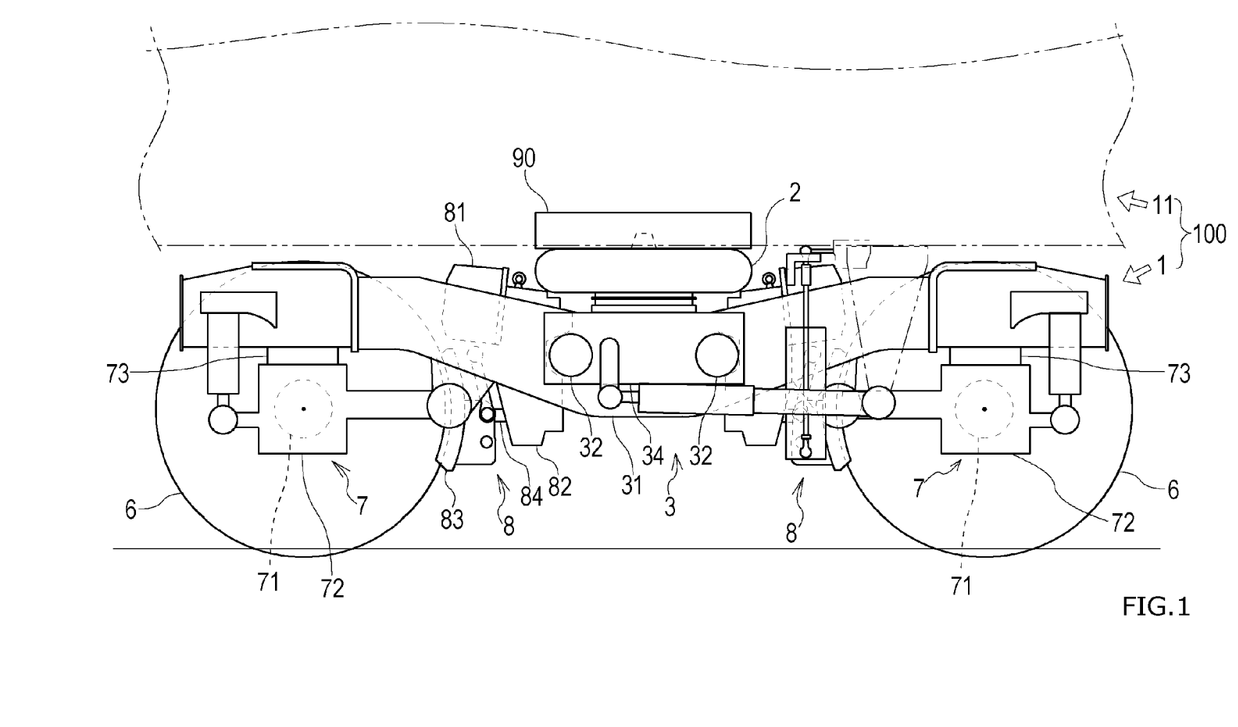
FIG. 1 is a side view showing a schematic configuration of a bogie of a railcar according to an embodiment of the present invention.
Figure 2:
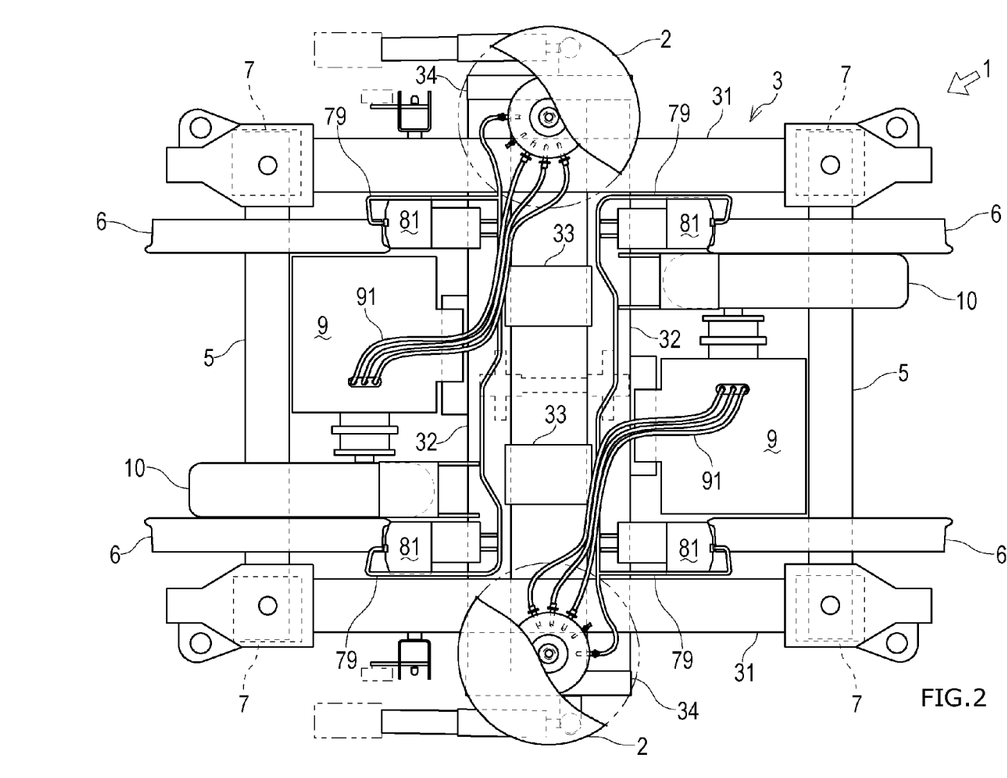
FIG. 2 is a plan view showing the schematic configuration of the bogie.
Figure 8:
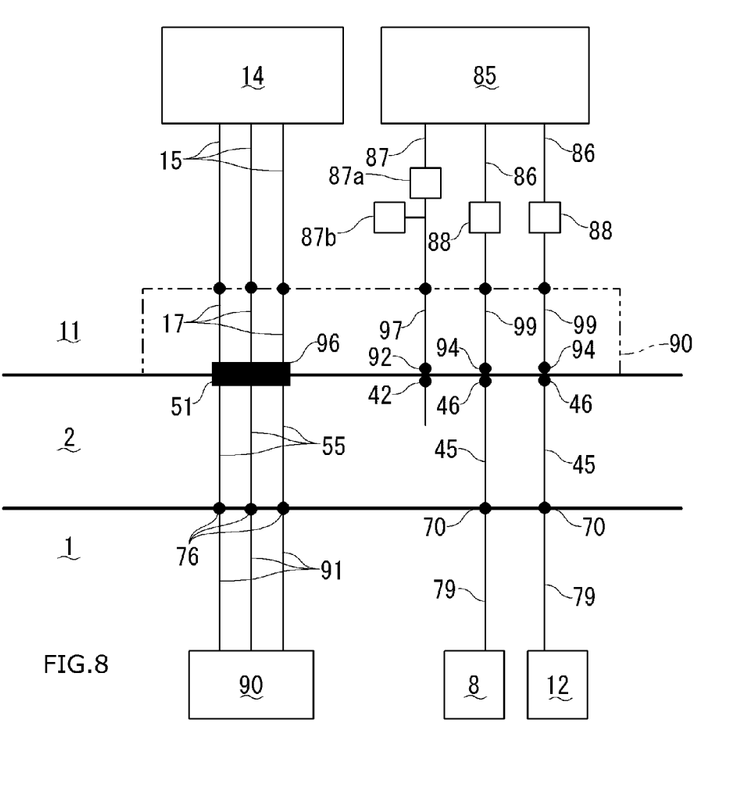
FIG. 8 is a diagram showing connection structures of wires and pipes extending between the bogie and carbody of the railcar.

Hereinafter, an embodiment of the present invention will be explained in reference to the drawings. FIG. 1 is a side view showing a schematic configuration of a bogie 1 of a railcar 100 according to the embodiment of the present invention. FIG. 2 is a plan view showing the schematic configuration of the bogie 1 of the railcar. FIG. 8 is a diagram showing connection structures of wires and pipes extending between the bogie 1 and carbody 11 of the railcar 100.

First, a schematic configuration of the railcar 100 according to the present embodiment will be explained. As shown in FIGS. 1 and 2, the railcar 100 is constituted by the bogie 1 and the carbody 11 supported by the bogie 1 through a carbody suspension including air springs 2 as bolster springs. The bogie 1 includes a bogie frame 3 receiving the carbody 11. The bogie frame 3 is constituted by: a pair of side sills 31 extending in a car longitudinal direction and parallel to each other; a pair of cross beams 32 each coupling the side sills 31 to each other in a car width direction (sleeper direction); a plurality of reinforcing sills 33 each coupling the cross beams 32 to each other in the car longitudinal direction; a pair of auxiliary sills 34 each coupling the cross beams 32 to each other in the car longitudinal direction; and the like. Each of the air springs 2 is placed so as to be supported by the auxiliary sill 34 and the side sill 31.

A pair of front and rear axles 5 are provided between the side sills 31. Wheels 6 are fixed to both respective car width direction sides of each of the axles 5. Each of both car width direction end portions of the axle 5 is supported by the side sill through an axle box suspension 7. The axle box suspension 7 is provided at a car width direction outer side of the wheel 6 and is constituted by: a bearing 71 rotatably supporting the axle 5; an axle box 72 accommodating the bearing 71; an axle spring 73 coupling an upper portion of the axle box 72 to the side sill 31; and the like.

An electric motor 9 and a gear box 10 are attached to the cross beam 32. An output shaft of the electric motor 9 is connected to a speed reduction gear accommodated in the gear box 10. An output of the electric motor 9 is transmitted to the axle 5 through the speed reduction gear. A plurality of bogie lead wires 91 (one example of bogie wires) are led out from an upper portion of the electric motor 9. As described below, the bogie lead wires 91 are connected to respective carbody lead wires 15 (one example of carbody wires; see FIG. 8).

Wheel tread brake equipment 8 configured to brake the rotation of the wheel 6 is provided at the cross beam 32. The wheel tread brake equipment 8 is constituted by: a brake cylinder 81 attached to the cross beam 32; a power transmission mechanism 82 configured to receive an output of the brake cylinder 81 to cause a push rod 84 to operate; a brake shoe 83 attached to a tip end of the push rod 84 and configured to pressure-contact a wheel tread of the wheel 6 and be separated from the wheel tread of the wheel 6; and the like. The brake cylinder 81 is an air cylinder and operates by compressed air supplied from an air source 85 provided at the carbody 11.

When the bogie 1 is a bogie located at a front side in a head car, the bogie 1 further includes parking brake equipment 12 (see FIG. 8). The parking brake equipment 12 is constituted by: a parking brake equipment cylinder 13 (see FIG. 8); a brake shoe (not shown) configured to be pressed against the wheel 6 by the force of a spring; and the like. When in normal traveling, the compressed air is charged in the cylinder 13 of the parking brake equipment 12 such that the force of the spring is prevented from being applied to the brake shoe. When causing a parking brake to operate, the air is released from the cylinder 13 such that the brake shoe is pressed against the wheel 6 by the force of the spring to generate braking force.

Figure 3:
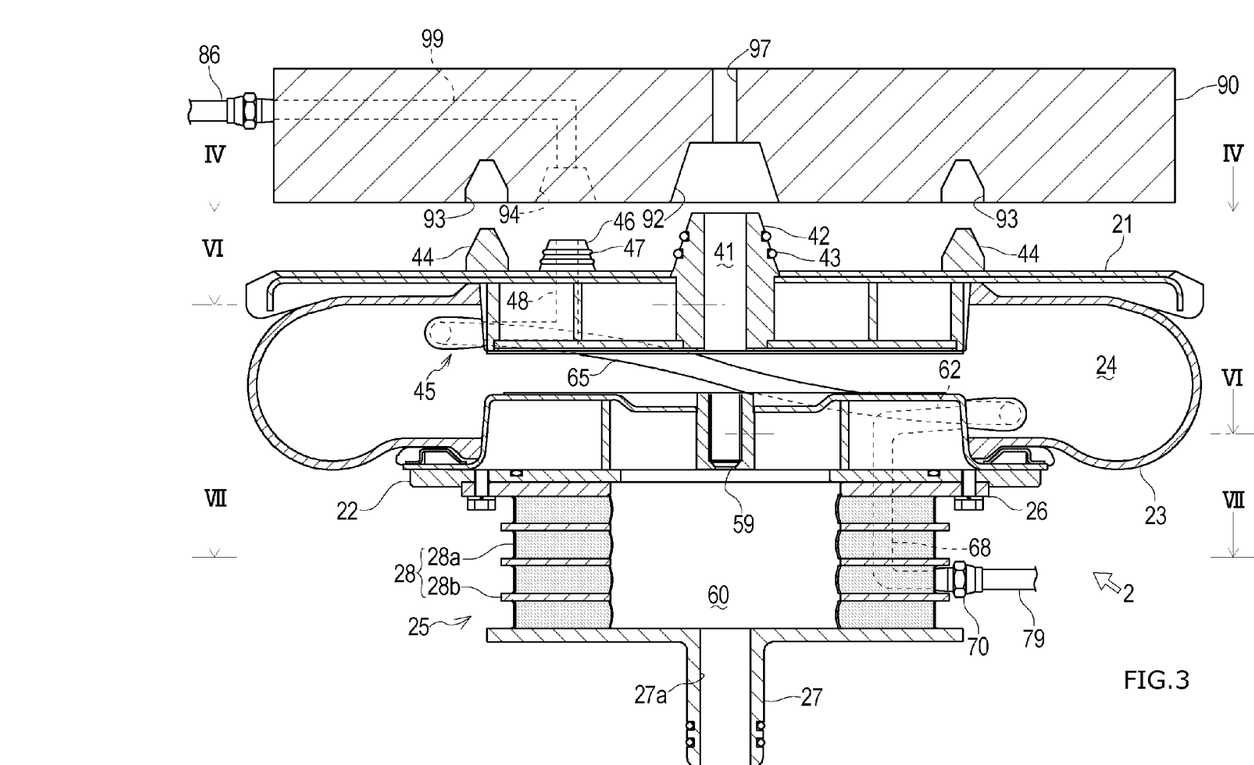
FIG. 3 is a cross-sectional view showing an air spring and an interface plate.
Figure 4:
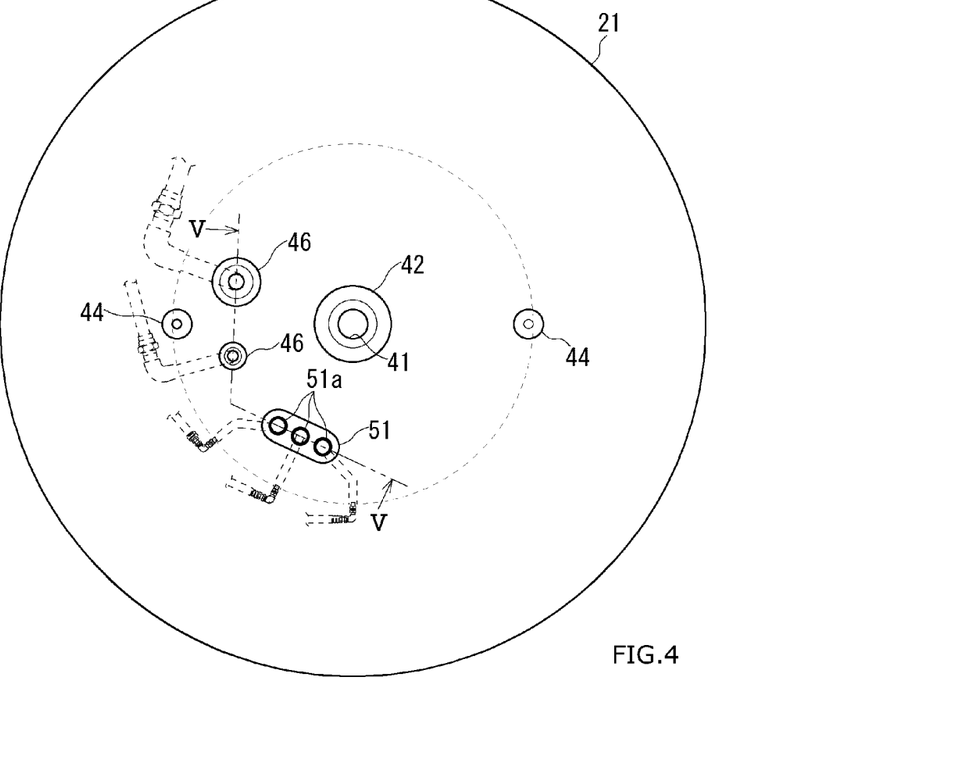
FIG. 4 is a cross-sectional view taken along line IV-IV of FIG. 3.
Figure 5:
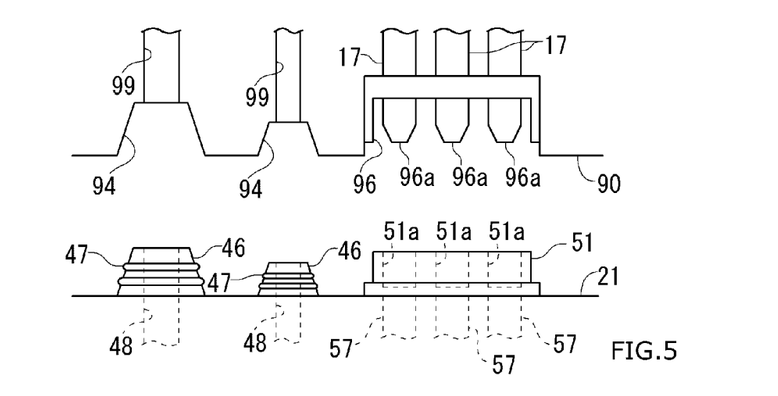
FIG. 5 is a cross-sectional view of an end surface indicated by line V-V of FIG. 4.
Figure 6:
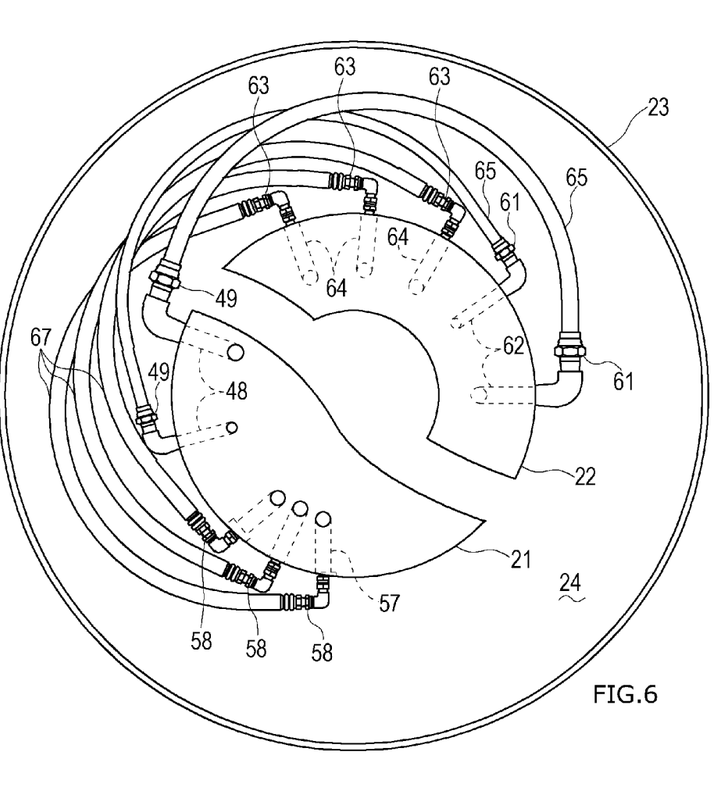
FIG. 6 is a cross-sectional view taken along line VI-VI of FIG. 3.
Figure 7:
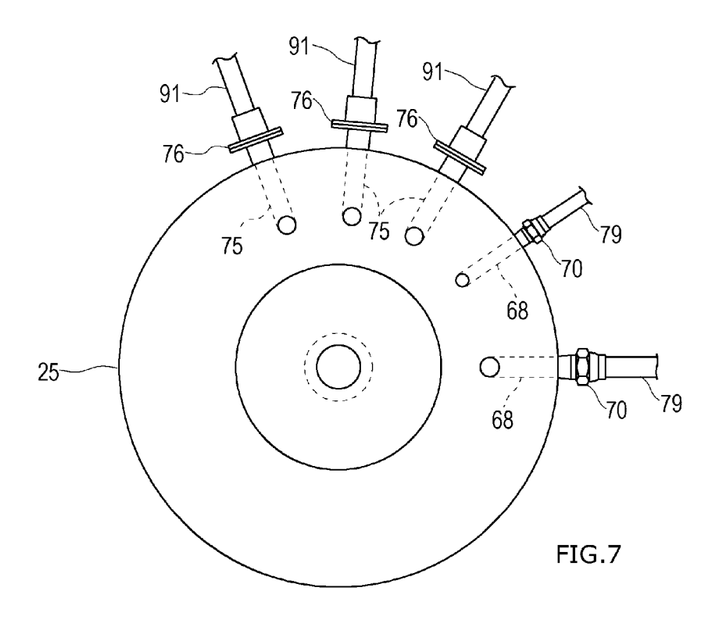
FIG. 7 is a cross-sectional view taken along line VII-VII of FIG. 3.

Next, a structure of the air spring 2 will be explained in detail. FIG. 3 is a cross-sectional view showing the air spring 2 and an interface plate 90. FIG. 4 is a cross-sectional view taken along line IV-IV of FIG. 3. FIG. 5 is a cross-sectional view of an end surface indicated by line V-V of FIG. 4. FIG. 6 is a cross-sectional view taken along line VI-VI of FIG. 3. FIG. 7 is a cross-sectional view taken along line VII-VII of FIG. 3. FIG. 3 shows only one internal pipe 45 among a plurality of internal pipes and internal wires, and the other internal pipes and internal wires are omitted. As shown in FIGS. 3 to 8, the air spring 2 includes: an upper surface plate 21; a lower surface plate 22 provided so as to oppose the upper surface plate 21; an elastic film 23 airtightly coupling a peripheral portion of the upper surface plate 21 and a peripheral portion of the lower surface plate 22 to each other to form an air chamber 24 inside the air spring 2; and an elastic stopper 25 connected to the lower surface plate 22. The air spring 2 is provided with the internal pipe 45 and an internal wire 55, and the internal pipe 45 and the internal wire 55 extend from an upper surface of the upper surface plate 21 through an inside of the upper surface plate 21 to a side surface of the elastic stopper 25.

As shown in FIGS. 3 to 6, the upper surface plate 21 of the air spring 2 has a substantially circular shape in a plan view. A connection pin 42 having a truncated cone shape projects from a middle portion of an upper surface of the upper surface plate 21. An air supply/exhaust port 41 is provided at a middle portion of the connection pin 42 so as to penetrate the upper surface plate 21 and communicate with the air chamber 24. An 0 ring that is a sealing member 43 is fitted to a periphery of the connection pin 42. A plurality of guide pins 44 each having a conical shaft shape project from the upper surface of the upper surface plate 21. On the upper surface plate 21 according to the present embodiment, two guide pins 44 are provided so as to be symmetrical with respect to the connection pin 42.

Connection pins 46 each having a truncated cone shape project from the upper surface of the upper surface plate 21. An 0 ring that is a sealing member 47 is fitted to a periphery of each of the connection pins 46. One end portion of the internal pipe 45 is open on a projecting end portion of the connection pin 46. On the upper surface plate 21 according to the present embodiment, two connection pins 46 that are a small-diameter pin and a large-diameter pin are provided. The small-diameter pin corresponds to an internal pipe for the parking brake equipment 12, and the large-diameter pin corresponds to an internal pipe for the wheel tread brake equipment 8. Passages 48 each connecting the connection pin 46 and a joint 49 are formed in the upper surface plate 21. The joint 49 is provided on a side surface of the upper surface plate 21, the side surface being exposed in the air chamber 24. In the present embodiment, two joints 49 are provided on the side surface of the upper surface plate 21 so as to correspond to the number of internal pipes 45.

Further, a socket 51 is provided on the upper surface of the upper surface plate 21. The socket 51 is provided with pinholes 51a. The number of pinholes 51a corresponds to the number of bogie lead wires 91 of the electric motor 9. In the present embodiment, three pinholes 51a are provided at the socket 51. Transmission passages 57 are formed in the upper surface plate 21 by conducting wires. Each of the transmission passages 57 extends from the pinhole 51a to a connector 58 provided on the side surface of the upper surface plate 21, the side surface being exposed in the air chamber 24. A part of the internal wires 55 is formed by the transmission passages 57. In the present embodiment, three connectors 58 are provided on the side surface of the upper surface plate 21 so as to correspond to the number of lead wires 91.

As shown in FIGS. 3 and 6, the lower surface plate 22 of the air spring 2 has a substantially circular shape in a plan view. A restrictor hole 59 is provided at a middle portion of the lower surface plate 22. The air chamber 24 and an auxiliary air chamber 60 in the elastic stopper 25 communicate with each other through the restrictor hole 59. The restrictor hole 59 is a mechanism that limits the flow rate of the air flowing between the air chamber 24 and the auxiliary air chamber 60. Joints 61 of the internal pipes 45 and connectors 63 of the internal wires 55 are provided on a side surface of the lower surface plate 22, the side surface being exposed in the air chamber 24. The joints 61 of the internal pipes 45 are connected to respective passages 62 that are provided in the lower surface plate 22 and are a part of the internal pipes 45. The connectors 63 of the internal wires 55 are connected to respective transmission passages 64 that are provided in the lower surface plate 22 and are a part of the internal wires 55.

The joint 49 of the upper surface plate 21 and the joint 61 of the lower surface plate 22 are connected to each other by a flexible pipe 65 such as a tube or a hose. The flexible pipe 65 extends in the air chamber 24 in a circular-arc shape in a bent state. The joint 49 of the upper surface plate 21 and the joint 61 of the lower surface plate 22 are provided so as to be different in phase from each other about a central axis of the air spring 2. In the present embodiment, the joint 49 of the upper surface plate 21 and the joint 61 of the lower surface plate 22 are provided so as to be different in phase from each other at 90° to 270° about the central axis of the air spring 2. With this, the flexible pipe 65 secures an adequate length that can prevent a case where the flexible pipe 65 is pulled to break since a distance between the joints 49 and 61 is changed by relative movements of the upper surface plate 21 and the lower surface plate 22 in a rotational direction, a lateral direction, or an upward/downward direction. Similarly, the connector 58 of the upper surface plate 21 and the connector 63 of the lower surface plate 22 are connected to each other by a flexible wire 67. As above, to prevent influences on a spring property of the air spring 2, the flexible pipes 65 and the flexible wires 67 are provided in the air spring 2.

As shown in FIG. 3, the elastic stopper 25 is constituted by: an upper base plate 26 fixed to the lower surface plate 22 by bolts; a lower base plate 27 integrally including a communication tubular portion 27a that is an air supply port through which air is supplied to the auxiliary air chamber 60 formed in the cross beam 32; and a cylindrical rubber stack body 28 connecting the upper base plate 26 and the lower base plate 27 to each other. The rubber stack body 28 is constituted by ring-shaped rubber members 28a and ring-shaped intermediate plates 28b which are alternately stacked on one another.

As shown in FIGS. 3 and 7, Each of passages 68 that are a part of the internal pipes 45 is formed in the elastic stopper 25 so as to be continuous with the passage 62 formed in the lower surface plate 22. An end portion of the passage 68 opens on a side surface of the rubber stack body 28, and a joint 70 is provided at an end portion of the passage 68. The passage 68 is formed so as to penetrate the rubber members 28a and intermediate plates 28b of the rubber stack body 28. However, the passage 68 may be formed so as to extend in a middle hollow portion of the rubber stack body 28 and then penetrate the rubber member 28a or the intermediate plate 28b. In the present embodiment, two joints 70 are provided on the side surface of the rubber stack body 28 of the elastic stopper 25 so as to correspond to the number of internal pipes 45. A bogie brake pipe 79 (one example of bogie pipes; see FIG. 8) extending from the brake cylinder 81 of the wheel tread brake equipment 8 or the cylinder 13 of the parking brake equipment 12 is connected to the joint 70. Further, each of transmission passages 75 that are a part of the internal wires 55 is formed in the elastic stopper 25 by a conducting wire so as to be continuous with the transmission passage 64 formed in the lower surface plate 22. The transmission passage 75 is connected to a connector 76 provided on the side surface of the rubber stack body 28. The bogie lead wire 91 extending from the electric motor 9 is connected to the connector 76.

As above, each of the internal pipes 45 extends in the air spring 2 such that: one end portion of the internal pipe 45 is the connection pin 46 provided at an upper portion of the upper surface plate 21; and the other end portion of the internal pipe 45 is the joint 70 provided at a side portion of the elastic stopper 25. The internal pipe 45 is constituted by: the passage 48 in the upper surface plate 21; the flexible pipe 65 in the air chamber 24; the passage 62 in the lower surface plate 22; and the passage 68 in the elastic stopper 25. Further, each of the internal wires 55 extends in the air spring 2 such that: one end portion of the internal wire 55 is the pinhole 51a of the socket 51 provided at the upper portion of the upper surface plate 21; and the other end portion of the internal wire 55 is the connector 76 provided at the side portion of the elastic stopper 25. The internal wire 55 is constituted by: the transmission passage 57 in the upper surface plate 21; the flexible wire 67 in the air chamber 24; the transmission passage 64 in the lower surface plate 22; and the transmission passage 75 in the elastic stopper 25.

The following will explain connection portions between the carbody 11 and the air spring 2. FIG. 8 is a diagram showing connection structures of the wires and pipes extending between the bogie 1 and carbody 11 of the railcar 100. As shown in FIGS. 1, 3, and 8, the carbody 11 and the air spring 2 are coupled to each other through the interface plate 90. The interface plate 90 is provided at a position on a lower surface of the carbody 11, the position opposing the air spring 2. A guide hole 93 into which the guide pin 44 provided at the upper surface plate 21 of the air spring 2 can be fittingly inserted is provided at a position on a lower surface of the interface plate 90, the position opposing the guide pin 44. The guide hole 93 is a bottomed hole having a shape complementarily corresponding to the conical shaft shape of the guide pin 44. In a state where the guide pin 44 of the air spring 2 and the guide hole 93 of the interface plate 90 are aligned with each other, the interface plate 90 is placed on the air spring 2. With this, the air spring 2 and the interface plate 90 are coupled to each other.

A carbody air pipe 87 (one example of carbody pipes) is connected to the interface plate 90. The compressed air is supplied from the air source 85 provided at the carbody 11 through the carbody air pipe 87. An air supply valve 87a and an air exhaust valve 87b are provided at the carbody air pipe 87. A connection hole 92 is provided at a position on the lower surface of the interface plate 90, the position opposing the connection pin 42. The connection pin 42 provided at the upper surface plate 21 of the air spring 2 can be fittingly inserted into the connection hole 92. The connection hole 92 is a bottomed hole having a shape complementarily corresponding to the truncated cone shape of the connection pin 42, and a communication passage 97 opens at a bottom of the hole. The communication passage 97 is provided in the interface plate 90, and the connection hole 92 and the carbody air pipe 87 are connected to each other through the communication passage 97. According to the above configuration, when the air spring 2 and the interface plate 90 are coupled to each other as above, the connection pin 42 is fitted in the connection hole 92. Thus, the communication passage 97 and the air supply/exhaust port 41 are connected to each other so as to be sealed against an outside by the shape of the connection pin 42, the shape of the connection hole 92, and the sealing member 43. With this, the air source 85 provided at the carbody 11 and the air chamber 24 of the air spring 2 are connected to each other through the carbody air pipe 87 and the communication passage 97 of the interface plate 90.

A connection hole 94 into which the connection pin 46 provided at the upper surface plate 21 of the air spring 2 can be fittingly inserted is provided at a position on the lower surface of the interface plate 90, the position opposing the connection pin 46. The connection pin 46 is the connection portion located at the air spring 2, and the connection hole 94 is the connection portion located at the interface plate 90. The connection hole 94 is a bottomed hole having a shape complementarily corresponding to the truncated cone shape of the connection pin 46, and a communication passage 99 opens at a bottom of the connection hole 94. The communication passage 99 extends in the interface plate 90 to be connected to a carbody brake pipe 86 on a side surface of the interface plate 90. The carbody brake pipe 86 constitutes a part of a brake pipe. The compressed air is supplied from the air source 85 provided at the carbody 11 through the brake pipe to the wheel tread brake equipment 8 or parking brake equipment 12 provided at the bogie. A control valve 88 configured to control the supply of the compressed air to the wheel tread brake equipment 8 is provided at the carbody brake pipe 86. According to the above configuration, when the air spring 2 and the interface plate 90 are coupled to each other as above, the connection pin 46 is fitted in the connection hole 94. Thus, the communication passage 99 and the internal pipe 45 of the air spring 2 are connected to each other so as to be sealed against the outside by the shape of the connection pin 46, the shape of the connection hole 94, and the sealing member 47. With this, the air source 85 provided at the carbody 11 is connected to the brake cylinder 81 of the wheel tread brake equipment 8 provided at the bogie 1 or the cylinder 13 of the parking brake equipment 12 provided at the bogie 1 through the carbody brake pipe 86, the communication passage 99 of the interface plate 90, the internal pipe 45 of the air spring 2, and the bogie brake pipe 79.

Further, a socket 96 is provided at a position on the lower surface of the interface plate 90, the position opposing the socket 51 provided at the upper surface plate 21 of the air spring 2. Plug pins 96a which can be inserted into the respective pinholes 51a of the socket 51 are provided at the socket 96. The pinholes 51a of the socket 51 is the connection portions located at the air spring 2, and the plug pins 96a of the socket 96 are the connection portions located at the interface plate 90. The carbody lead wires 15 extending from an electric motor driving device 14 provided at the carbody 11 are connected to the side surface of the interface plate 90. The plug pins 96a of the socket 96 and the carbody lead wires 15 are connected to each other by communication passages (transmission passages) 17 formed in the interface plate 90. According to the above configuration, when the air spring 2 and the interface plate 90 are coupled to each other as above, the plug pins 96a of the socket 96 of the interface plate 90 are inserted into the respective pinholes 51a of the socket 51 provided at the upper surface plate 21 of the air spring 2. With this, the electric motor driving device 14 provided at the carbody 11 and the electric motor 9 provided at the bogie 1 are connected to each other through the carbody lead wires 15, the communication passages 17 of the interface plate 90, the internal wires 55 of the air spring 2, and the bogie lead wires 91.

According to the railcar 100 configured as above, when the carbody 11 and the bogie 1 need to be separated from each other for inspection or maintenance, a towing mechanism and a center pin (both not shown) are decoupled from each other, and the carbody 11 is then lifted up by a crane or the like. With this, the guide pins 44, the connection pin 42, the connection pins 46, and the pinholes 51a are separated from the guide holes 93, the connection hole 92, the connection holes 94, and the plug pins 96a, respectively. Thus, the interface plate 90 and the upper surface plate 21 of the air spring 2 are separated from each other. With this, the connection between the air spring 2 and the air source 85 is cut. In addition, the connection between the air source 85 and the wheel tread brake equipment 8, the connection between the air source 85 and the parking brake equipment 12, and the connection between the electric motor driving device 14 and the electric motor 9 are also cut. To cut these connections, it is unnecessary to perform conventional special operations and work of uncoupling mechanical couplings of the wires and pipes extending between the bogie 1 and the carbody 11. As above, according to the railcar bogie 1 of the present embodiment, the operation of separating the carbody 11 and the bogie frame 3 from each other is simple and easy.

Further, according to the railcar 100 configured as above, when connecting the carbody 11 and the bogie 1 to each other, the carbody 11 is lifted up to be placed on the bogie frame 3 such that the upper surface plate 21 of the air spring 2 attached to the bogie frame 3 and the interface plate 90 are aligned with each other. With this, the guide pins 44, the connection pin 42, the connection pins 46, and the pinholes 51a are connected to the guide holes 93, the connection hole 92, the connection holes 94, and the plug pins 96a, respectively. Thus, the air spring 2 and the air source 85 are connected to each other. In addition, the air source 85 is connected to the wheel tread brake equipment 8 and the parking brake equipment 12, and the electric motor driving device 14 and the electric motor 9 are connected to each other. To realize these connections, it is unnecessary to perform conventional special operations and work of realizing the mechanical couplings of the wires and pipes extending between the bogie 1 and the carbody 11. As above, according to the railcar bogie 1 of the present embodiment, the operation of connecting the carbody 11 and the bogie frame 3 to each other is simple and easy.

As explained above, the railcar 100 according to the present embodiment includes the air spring 2 at which the internal pipes 45 and the internal wires 55 are provided. However, at the air spring 2, at least one of the internal pipe 45 or the internal wire 55 may be provided. With this, the air spring 2 is efficiently utilized as a space for pipes and/or wires. By adopting the air spring 2 in the railcar 100, the railcar 100 can be easily configured such that the work of disconnecting and connecting the wires and/or pipes extending between the carbody 11 and the bogie 1 can be simplified. As one preferred example, the railcar 100 according to the present embodiment is configured such that: the pipes and wires of the carbody 11 are collected at the interface plate 90; the pipes and wires of the bogie 1 are collected at the air spring 2; and these pipes and wires are connected by the operation of placing the interface plate 90 on the air spring 2.

The wires and pipes collected at the interface plate 90 are connected to the connectors and joints on the side surface of the interface plate 90 to be arranged orderly. Similarly, the wires and pipes collected at the air spring 2 are connected to the connectors and joints on the side surface of the elastic stopper 25 of the air spring 2 to be arranged orderly. Further, portions of the wires and pipes extending between the bogie 1 and the carbody 11 extend in the interface plate 90 and the air spring 2, the portions especially tending to contact with each other by the displacement of the railcar according to conventional railcars. By the above routing of the pipes and wires, the contact of the pipes and wires with each other by the displacement of the railcar is avoided. Since the routing of the pipes and wires is determined as above when designing the railcar, the degree of freedom of the design of the railcar increases, and the design of the railcar can be simplified.

The foregoing has explained a preferred embodiment of the present invention. However, the present invention is not limited to the above embodiment. Various modifications may be made within the scope of the present invention.

For example, the carbody suspension of the above embodiment is a bolsterless carbody suspension. However, the carbody suspension of the above embodiment is not limited to this. Instead of the bolsterless carbody suspension, a bolster carbody suspension (an indirect mounted carbody suspension or a direct mounted carbody suspension) may be used.

For example, the bogie 1 of the above embodiment is a driving bogie including the electric motor 9 but may be a driven bogie. If the bogie 1 is the driven bogie, the conducting wires (such as the carbody lead wires 15, the bogie lead wires 91, and the internal wires 55 connecting the wires 15 and 91 to each other) connecting the electric motor 9 and the electric motor driving device 14 to each other are unnecessary. To be specific, the air spring 2 according to the above embodiment includes both the internal wire and the internal pipe but may include at least one of the internal wire or the internal pipe.

Further, for example, the railcar 100 of the above embodiment may be provided with the other conducting wires, such as ground wires and sensor cables, extending between the bogie 1 and the carbody 11 as with the lead wires of the electric motor 9. To be specific, the internal wire of the air spring 2 may be used as a part of at least one of: a conducting wire connecting the electric motor driving device 14 and the electric motor 9 to each other; a conducting wire connecting a control device (not shown) at the carbody 11 and a sensor at the bogie 1 to each other; or a conducting wire through which the carbody 11 is grounded.

REFERENCE SIGNS LIST 100 railcar
1 bogie
2 air spring
21 upper surface plate
22 lower surface plate
23 elastic film
24 air chamber
25 elastic stopper
3 bogie frame
5 axle
6 wheel
7 axle box suspension
8 wheel tread brake equipment
81 brake cylinder
9 electric motor
91 bogie lead wire
10 gear box
11 carbody
12 parking brake equipment
13 cylinder
14 electric motor driving device
15 carbody lead wire
17 communication passage
41 air supply/exhaust port
42, 46 connection pin
43, 47 sealing member 44 guide pin
45 internal pipe
48, 62, 68 passage
49, 61, 70 joint
51, 96 socket
55 internal wire
57, 64, 75 transmission passage
58, 63, 76 connector
59 restrictor hole
60 auxiliary air chamber
65 flexible pipe
67 flexible wire
85 air source
90 interface plate
92, 94 connection hole
93 guide hole
94 connection hole
97, 99 communication passage

The invention claimed is:

1. An air spring comprising:
an upper surface plate;
a lower surface plate provided so as to oppose the upper surface plate;
an elastic film airtightly coupling a peripheral portion of the upper surface plate and a peripheral portion of the lower surface plate to each other to form an air chamber inside the elastic film;
an elastic stopper connected to the lower surface plate; and
at least one of an internal pipe or an internal wire, the internal pipe extending from an upper surface of the upper surface plate to a side surface of the elastic stopper, the internal wire extending from the upper surface of the upper surface plate to the side surface of the elastic stopper.

2. The air spring according to claim 1, wherein at least one of the internal pipe or the internal wire extends through the upper surface plate, the air chamber, the lower surface plate, and the elastic stopper.

3. The air spring according to claim 1, wherein a part of at least one of the internal pipe or the internal wire is constituted by a flexible pipe or a flexible wire, the flexible pipe extending in the air chamber in a circular-arc shape, the flexible wire extending in the air chamber in the circular-arc shape.

4. The air spring according to claim 1, wherein:
the air spring is a bolster spring of a railcar; and
the internal pipe is a part of a brake pipe, compressed air being supplied from an air source at a carbody of the railcar through the brake pipe to brake equipment at a bogie of the railcar.

5. The air spring according to claim 1, wherein:
the air spring is a bolster spring of a railcar; and
the internal wire is a part of at least one of
a conducting wire connecting an electric motor driving device at a carbody of the railcar and an electric motor at a bogie of the railcar to each other,
a conducting wire connecting a control device at the carbody of the railcar and a sensor at the bogie of the railcar to each other, or
a conducting wire, the carbody of the railcar being grounded through the conducting wire.

6. A railcar comprising:
a carbody;
a bogie;
an interface plate provided at the carbody; and
the air spring according to claim 1, the air spring being provided between the interface plate and a bogie frame of the bogie.

7. The railcar according to claim 6, further comprising at least one of a pipe or a wire, the pipe extending between the carbody and the bogie, the wire extending between the carbody and the bogie, wherein:
the pipe extending between the carbody and the bogie includes a carbody pipe, the interface plate, the internal pipe of the air spring, and a bogie pipe; and
the wire extending between the carbody and the bogie includes a carbody wire, the interface plate, the internal wire of the air spring, and a bogie wire.

8. The railcar according to claim 7, wherein:
the air spring includes a first connection portion,
an end portion of at least one of the internal pipe or the internal wire is provided at the first connection portion;
the first connection portion is located at an upper surface of the air spring; and
the interface plate includes a second connection portion fittingly connected to the first connection portion, the second connection portion being located at a lower surface of the interface plate and connected to the carbody pipe or the carbody wire.

* * * * *